United States Patent
Epping

(10) Patent No.: US 11,659,955 B2
(45) Date of Patent: May 30, 2023

(54) METHOD AND DEVICE FOR PRODUCTION OF MILK FOAM

(71) Applicant: CUP&CINO Kaffeesystem—Vertrieb GmbH & Co. KG, Hövelhof (DE)

(72) Inventor: Frank Josef Paul Epping, Hövelhof (DE)

(73) Assignee: CUP&CINO Kaffeesystem- Vetrieb GmbH & Co. KG, Hövehof (DE)

( * ) Notice: Subject to any disclaimer, the term of this patent is extended or adjusted under 35 U.S.C. 154(b) by 12 days.

(21) Appl. No.: 15/964,574

(22) Filed: Apr. 27, 2018

(65) Prior Publication Data

US 2018/0317698 A1 Nov. 8, 2018

(30) Foreign Application Priority Data

May 3, 2017 (EP) .................................... 17169251

(51) Int. Cl.
*A47J 31/44* (2006.01)
*A23L 2/54* (2006.01)
*A47J 31/54* (2006.01)

(52) U.S. Cl.
CPC ............. *A47J 31/4485* (2013.01); *A23L 2/54* (2013.01); *A23V 2002/00* (2013.01); *A47J 31/542* (2013.01)

(58) Field of Classification Search
None
See application file for complete search history.

(56) References Cited

U.S. PATENT DOCUMENTS

| 4,084,432 A * | 4/1978 | Lecoffre | G01M 10/00 73/148 |
| 2005/0233043 A1* | 10/2005 | Dirren | A47J 31/4485 426/569 |
| 2007/0221068 A1* | 9/2007 | Boussemart | A47J 27/004 99/279 |
| 2013/0040028 A1* | 2/2013 | Doppe | A47J 31/4485 426/474 |
| 2013/0209639 A1* | 8/2013 | Larson | A47J 31/4496 426/474 |
| 2014/0197554 A1* | 7/2014 | Bonsch | A47J 31/4485 261/37 |
| 2014/0299001 A1 | 10/2014 | Rimpl | |

(Continued)

FOREIGN PATENT DOCUMENTS

DE 202011110158 U1 12/2012
DE 102014216534 B3 2/2016
(Continued)

OTHER PUBLICATIONS

European Official Action (Oct. 30, 2017) from corresponding European App. 17169251,0.

*Primary Examiner* — Viren A Thakur
*Assistant Examiner* — Ashley Axtell
(74) *Attorney, Agent, or Firm* — WRB-IP PLLC

(57) ABSTRACT

A device for production of milk foam with adjustable temperature includes a pump for conveying the milk from at least one container in lines to an outlet, an air supply for delivering air into the line, a continuous-flow heater and a throttle device. The continuous-flow heater can be disposed on the pressure side of the pump and the throttle device can be disposed downstream from the continuous-flow heater.

8 Claims, 1 Drawing Sheet

(56) References Cited

U.S. PATENT DOCUMENTS

| | | | | |
|---|---|---|---|---|
| 2016/0051083 A1* | 2/2016 | Turi | .................... | B01F 3/04808 |
| | | | | 426/474 |
| 2016/0135474 A1* | 5/2016 | Vetterli | ............... | B01F 3/04446 |
| | | | | 426/474 |
| 2019/0000263 A1* | 1/2019 | Knip | ................... | A47J 31/4485 |

FOREIGN PATENT DOCUMENTS

| | | | | | |
|---|---|---|---|---|---|
| EP | 1593330 | A2 | | 11/2005 | |
| EP | 3066964 | A1 * | 9/2016 | .......... | A47J 31/4485 |
| WO | 2008083941 | A1 | | 7/2008 | |
| WO | 2008120991 | A1 | | 10/2008 | |

* cited by examiner

METHOD AND DEVICE FOR PRODUCTION OF MILK FOAM

BACKGROUND AND SUMMARY

The invention describes a method for production of milk foam with adjustable temperature and a device for production of milk foam with adjustable temperature.

The production of milk foam, i.e. a relatively stable mixture of milk, or respectively milk substitute, and air or gas, which is heated if necessary, is generally known and is used in manifold ways in diverse coffee machines.

Thus WO 2008/083941 A1 (also published as US 2010/0075007) describes a method and a device for production of milk foam, in which a single pump is provided both for conveying milk and also for suctioning the air necessary for generation of milk foam, and whereby downstream from the pump the mixture is conveyed via a throttle point to an outlet. For generation of warm milk foam, the milk-air mixture, after the throttle point, by means of a provided valve, is heated via a continuous flow heater disposed in a parallel line section, and is conveyed to the outlet.

Known from DE 10 2014 216 534 B3 (also published as US 2016/0051083) is a device and a method for frothing milk, which, mixed with air, is conveyed by a feed pump to an outlet and whereby, on the pressure side of the feed pump, at least a throttle and a continuous flow heater are disposed. The device is able to be operated in a cold foam mode and in a warm foam mode. In the warm foam mode, a control unit activates the continuous flow heater, disposed downstream from the throttle, and sets a predetermined flow-through cross section of the throttle, which differs from that of the cold foam mode.

Known from EP 1 593 330 A2 (also published as US 2005/0233043) is a method and a device for production of milk foam, whereby the milk, enriched with air or gas, is conveyed to an outlet via a continuous flow heater and throttle point, disposed downstream from the continuous flow heater. Owing to the disposal of the throttle point downstream from the pump, the pressure ratio in the continuous flow heater is not optimized so as to prevent the formation of large air bubbles.

The known systems for production of milk foam of varying temperature comprise in general a feed pump for suctioning of milk, or generally of the fluid to be frothed, from a container, and conveying the same through a system of lines to an outlet. Provided furthermore are e.g. an adjustable air supply device and a temperature adjustment arrangement to bring the milk, or respectively the milk-air mixture, to an adjustable temperature, as needed.

Generally, already with introduction of air into a milk flow, a first foam formation step takes place, which produces a coarse, polydisperse pre-foam. For production of as homogeneous and monodisperse a foam as possible, pressure increase elements or respectively throttle devices or passage resistance elements are known, which are set up in order to produce a foam from a milk-air mixture through generation of counterpressure, in that the air disperses in the form of bubbles with a certain size distribution. Provided instead of a pressure increasing element can be a mixing element, which divides the current flowing through into partial currents and provides for a mixing of the partial currents in such a way that a milk foam arises.

It is desirable to provide a method and a device for production of milk foam with adjustable temperature, whereby in a simple way, and in a way independent of the temperature, the consistency and the quality of the produced foam is improved with respect to known methods and devices. The method according to an aspect of the invention is preferably designed to produce milk foam with adjustable temperature by means of the device according to an aspect of the invention.

With respect to the present invention, the term milk/air mixture or respectively milk-air emulsion is used in the sense of a general term also encompassing milk foam. Milk foam has a structure of proteins and fats which encloses air or respectively gas bubbles. The foam in the sense of the present invention is of better consistency and quality when a homogeneous, stable foam is produced. Understood by the term "stable foam" is a foam with a bubble distribution as even as possible during the entire dispensing time.

The method according to an aspect of the invention for production of milk foam with adjustable temperature envisages that milk from at least one container and supplied air from a pump are suctioned as a milk/air mixture, conveyed through a continuous flow heater and thereby heated, and, in a heated way, the mixture, transformed by a throttle device into a milk foam, is conveyed to an outlet. Furthermore the method foresees that the milk/air mixture is heated by the continuous flow heater and transformed into milk foam on the pressure side of the pump.

Foreseen according to the invention is that on the pressure side of the pump counterpressure is generated in the milk/air mixture by the throttle device. The compression of the milk/air mixture in this way brings about the production of a fine-pored foam. This is based at least partially on the effect occurring in the continuous flow heater of the counterpressure generated by the downstream throttle device, which counterpressure acts against the formation of larger air bubbles in the milk/air mixture to be heated. Furthermore the temperature regulation in the continuous flow heater can be simplified and becomes more precise.

The device according to an aspect of the invention for production of milk foam with adjustable temperature according to the method for production of milk foam with adjustable temperature comprises a pump for conveying milk from at least one container to an outlet, an air supply for delivering air, a continuous flow heater and a throttle device. This basic structure corresponds substantially to known devices. Above and beyond this, the device provides for there being disposed on the pressure side of the pump the continuous flow heater and, downstream from the continuous flow heater, the throttle device. Achieved through this arrangement according to the invention is that the counterpressure generated in the throttle device also has an effect in an advantageous way in the continuous flow heater. In particular finer air bubbles can thus be produced also in the heated milk/air mixture. The temperature control of the continuous flow heater is also promoted in an advantageous way.

Provided according to the invention is a continuous flow heater in which the milk or respectively milk-air mixture conveyed in the line system by the pump is heated to the desired adjustable temperature.

According to an aspect of the invention, the continuous flow heater is preferably designed as thick film heater with an electrical resistance heater element whose temperature is adjustable. The thick film heater comprises a heat transfer element for transferring the heat generated by the electrical resistance heater element to the fluid to be heated, in particular a milk/air mixture. The heat transfer element provides a flow path for the fluid to be heated, for example in the form of a spiral-shaped passageway. The milk/air mixture, which is fed to the continuous flow heater, thereby flows along a spiral-shaped passageway running from outside to inside, whereby the mixture is heated to the desired, adjustable temperature. Furthermore suitably placed temperature sensors are provided which are connected to a control unit. With a thick film heater of this kind quick temperature control is possible with at the same time more favorable cost and energy efficiency.

The throttle device disposed in the device according to the invention is designed to promote at least partially the milk foam formation. Downstream from the pump, i.e. on the pressure side, a milk/air mixture is already present, which has a desired adjustable temperature after the continuous flow heater and is transformed subsequently in the throttle device into a stable milk foam, i.e. is further frothed up. The throttle device thereby generates counterpressure at a throttle point so that in the overall effect the fed milk/air mixture is frothed up into a milk foam of desired consistency and quality. At the throttle point, according to the Venturi effect, there occurs at a constricted point with increased flow rate a lesser pressure than upstream therefrom; there results to a large extent a sudden relaxation and connected with this a generation of bubbles.

Through the arrangement according to the invention of the throttle device downstream from the continuous flow heater, counterpressure is also generated in this throttle device, so that the air or respectively gas bubbles present in the heated milk/air mixture cannot expand in an unhindered way. The arising foam is fine-pored. Resulting above and beyond this is that the heat transfer in the continuous flow heater is improved since the air or respectively gas bubbles present are smaller, and the otherwise poorer heat transfer of the air is thereby prevented. Consequently the continuous flow heater can be more quickly and effectively regulated in an advantageous way.

The throttle device is adjustable or is designed with a fixed setting to constrict the flow path of the milk/air mixture at the throttle point, in particular to create a throttle function through a local cross-sectional narrowing, e.g. with a progressive course. The cross-sectional narrowing can thereby be designed with changeable free cross-sectional area or with a fixed set free cross-sectional area. A cross-sectional narrowing of the provided cross-sectional area can be achieved by means of nozzle, baffle, e.g. aperture plate or annular gap plate, valve, e.g. needle valve, or choke valve. With a flexible line, a clamping device, for example a hose clamp, can be provided. A narrowing corresponds to a decreased cross-sectional flow area with respect to the line immediately upstream. Downstream from the throttle point a widening or respectively expansion of the flow cross section is foreseen, e.g. with a degressive course. The spacing between narrowing and widening of the line cross section amounts to maximally 0.5 to 2 mm.

To produce a high quality foam the diameter of the flow cross section at the throttle point lies in a range of 0.5 to 2 mm.

In one embodiment, the throttle device is controllable by a control unit, i.e. the flow cross section is adjustable. It has been shown that the foam consistency is dependent upon the temperature.

The production of a high quality, fine-pored foam is based on a harmonized co-ordination of pump, throttle device, line cross section and line length, whereby in particular the pressure conditions existing downstream from the throttle device are of significance for the foam quality, whereby the pressures lie in a range between 4 and 15 bar.

Foreseen according to the invention is that a control device controls pump, valves, continuous flow heater and possibly metering equipment.

Provided, according to the invention, downstream from the throttle device, is a line section whose cross section and length to the outlet are selected in such a way that the foam quality of the milk foam is improved. This line section presents a kind of calming section in which the air in the milk/air mixture, which can still be at least partially in the form of large bubbles, disperses into fine bubbles. Above and beyond this, the line section downstream from the throttle device also influences the flow of the milk/air mixture, which still has in part turbulent portions, in that the laminar portion of the flow of the mixture is increased.

This line section is preferably designed with a constant inner diameter, which differs from the inner diameter existing upstream, and extends over a length of between 0.5 to 2 m, preferably about 1.5 m. In this line section a gradual pressure drop occurs with slight pressure difference per length unit.

BRIEF DESCRIPTION OF DRAWINGS

Further preferred features and preferred embodiments will be explained in the following with reference to embodiment examples and the FIGURE.

DETAILED DESCRIPTION

Figure 1:
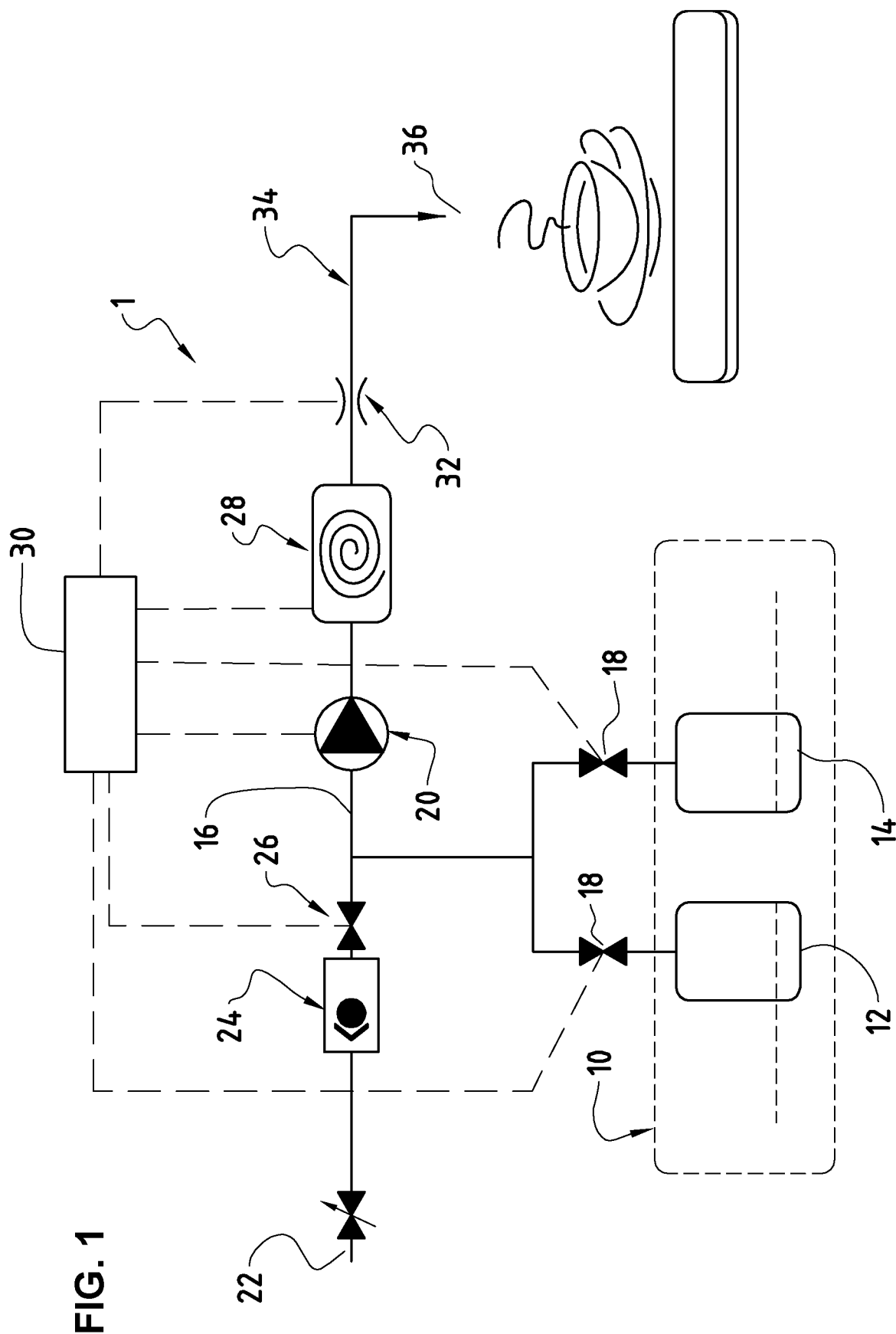
FIG. 1 shows a schematic representation of a device according to the invention for production of milk foam.

FIG. 1 shows schematically a device 1 for production of milk foam with an adjustable temperature. As shown in FIG. 1, disposed in an area designated by 10 are a first container 12 and a second container 14, in which milk of a first type and of a second type are stored. The area 10 is preferably cooled. The first and the second containers 12, 14 are connected to a first line 16, a valve 18 being provided in each case in the feed lie to line 16, so that selectively milk or milk substitute can be taken out of one of the first and second containers 12, 14. The line 16 connects the first and second containers 12, 14 to a pump 20, which is set up to convey milk or respectively milk substitute and air in the line 16. The air is suctioned via an air supply device 22, for example from the surrounding area, and is conveyed via a return valve 24 and a variable valve device 26 to the suction side of the pump 20. Connected to the pump on the pressure side is a continuous flow heater 28, which is preferably designed as continuous flow heater in the form of a thick film heater. Such a continuous flow heater provides e.g. a spiral-shaped flow path for the milk enriched with air, i.e. for the milk/air mixture. With active thick film heater, the milk/air mixture is heated along the flow path to a desired adjustable temperature, which is regulated by an included control unit 30. By means of the control unit 30, the production of a portion of milk foam with a desired adjustable temperature can be triggered, whereby the amount of air, the amount and type of milk can likewise be defined.

To be learned furthermore from FIG. 1 is that disposed downstream from the continuous flow heater 28 is a throttle device 32, which produces a stable and homogeneous milk foam from the already present, possibly heated, milk/air mixture. The throttle device 32 can be designed as nozzle, baffle, fixed or adjustable throttle valve, whereby a narrowing of the flow cross-sectional area at a throttle point is foreseen. In addition to the narrow place, the throttle device 32 can have downstream therefrom a widening of the flow cross section. In particular the throttle device 32 can be designed as a flow control or metering valve adjustable by means of the control unit 30 or another device. The throttle device 32 generates counterpressure which also makes itself felt in the flow path contained in the continuous flow heater 28. Achieved thereby is that the air bubbles, tending toward expansion at higher temperature and thus becoming bigger, are prevented. Smaller air bubbles in a milk/air mixture facilitate the heating of the mixture, which otherwise is negatively influenced by air as poor thermal conductor.

An adjustable throttle device 32 makes possible, in correlation with the supplied air quantity and the temperature, an optimal mixing of air and milk into a milk/air mixture and a dispersion of small air bubbles in the mixture, which stand for a high quality foam.

Provided between throttle device 32 and an outlet 36, at which milk foam at the desired temperature or also cold or warm milk is dispensable, for instance in a provided cup, is a line section 34, which can also be viewed as calming section. In this line section 34 the flow characteristic of the milk foam flowing through is influenced. In particular the line section 34 is implemented with a constant inner diameter (Di), which preferably differs from the inner diameter upstream from the throttle device 32. The length of the line section 34 lies in a range of 0.5 to 2 m, preferably at about 1.5 m.

The invention claimed is:

1. A method for production of stable milk foam with adjustable temperature, comprising
   suctioning milk from at least one container and suctioning air, the milk and the air being delivered from a pump as a milk and air mixture,
   conveying the milk and air mixture toward an outlet after passing the milk and air mixture through a continuous flow heater and heating the milk and air mixture in the continuous-flow heater when the continuous flow heater is turned on,
   after conveying the milk and air mixture through and heating the milk and air mixture in the continuous-flow heater, conveying the milk and air mixture through a line portion between the continuous-flow heater to a throttle device, converting the milk and air mixture into milk and air mixture stable milk foam in the throttle device, and conveying the stable milk foam through a constant inner diameter line section to an outlet, the line section being disposed immediately downstream of the throttle device, the inner diameter of the line section being different from an inner diameter of the line portion, and
   wherein the milk and air mixture is heated in the continuous flow heater, the continuous flow heater being designed as thick film heater with an electrical resistance heater element whose temperature is adjustable, and converted into the stable milk foam on a pressure side of the pump downstream of the continuous flow heater and counterpressure is generated by the throttle device in the milk and air mixture on the pressure side of the pump.

2. The method according to claim 1, wherein the line section has a length of 0.5 to 2 m.

3. A device for production of stable milk foam with adjustable temperature, comprising
   a pump for conveying milk via a first line from at least one container to the pump,
   an air supply for delivering air into the first line to produce a milk and air mixture,
   a continuous flow heater for heating the milk and air mixture, and
   a throttle device for producing a stable milk foam from the milk and air mixture,
   wherein the continuous flow heater is disposed on a pressure side of the pump and is designed as a thick film heater with an electrical resistance heater element whose temperature is adjustable, and the throttle device is disposed downstream from the continuous flow heater, wherein a constant inner diameter line section is disposed immediately downstream from the throttle device and extends to an outlet, the inner diameter of the line section being different than an inner diameter of a portion of a line portion between the continuous-flow heater and the throttle device.

4. The device according to claim 3, wherein the continuous flow heater provides a spiral-shaped passageway for the milk and air mixture to be heated.

5. The device according to claim 3, wherein a control unit is provided to control the pump, valves, the continuous flow heater and/or the throttle device.

6. The device according to claim 5, wherein the control unit sets a flow-through cross-sectional area for the throttle device.

7. The device according to claim 6, wherein the continuous flow heater provides a spiral-shaped passageway for the milk and air mixture to be heated, and wherein the flow-through cross-sectional area of the throttle device is regulated by the control unit as a function of the temperature of the milk and air mixture to be heated.

8. The device according to claim 3, wherein the line section has a length of 0.5 to 2 m.

* * * * *